June 15, 1965   F. DE TERÁN TROYANO   3,188,693
JOINT STRUCTURE FOR CONNECTING RELATED PARTS
Filed March 14, 1962                    5 Sheets—Sheet 5
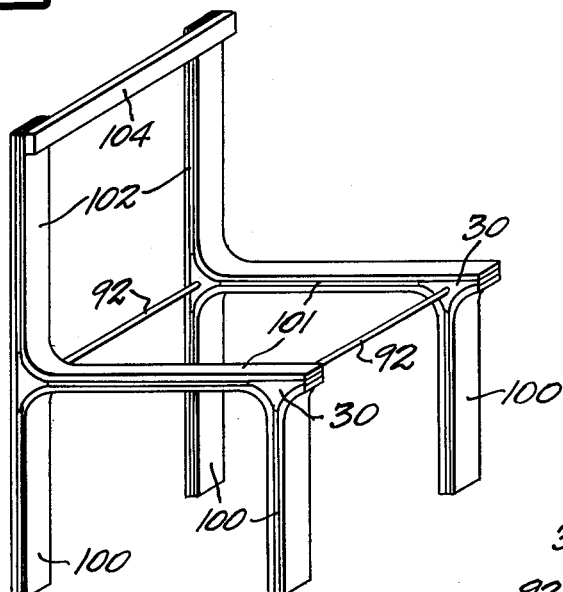
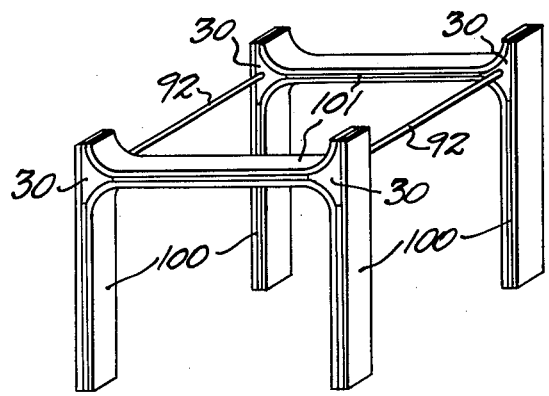
INVENTOR.
FERNANDO DE TERÁN TROYANO
BY
Eugene C. Knoblock
ATTORNEY

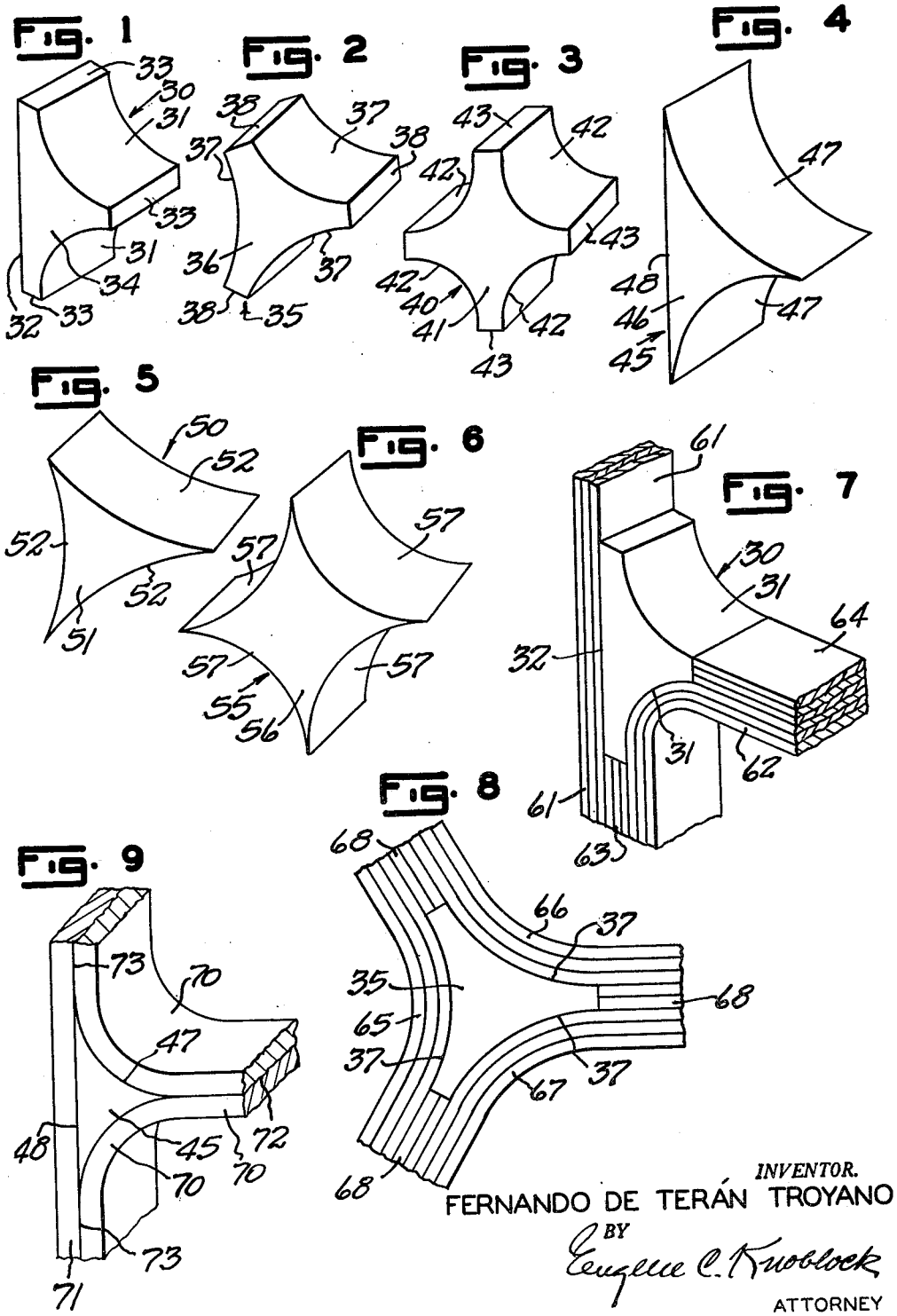

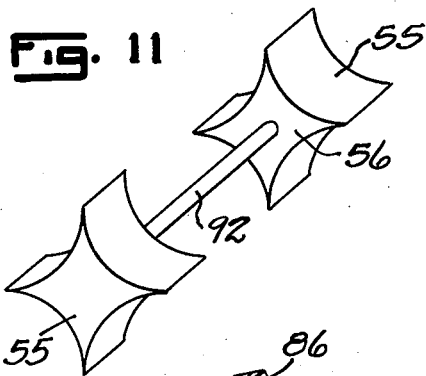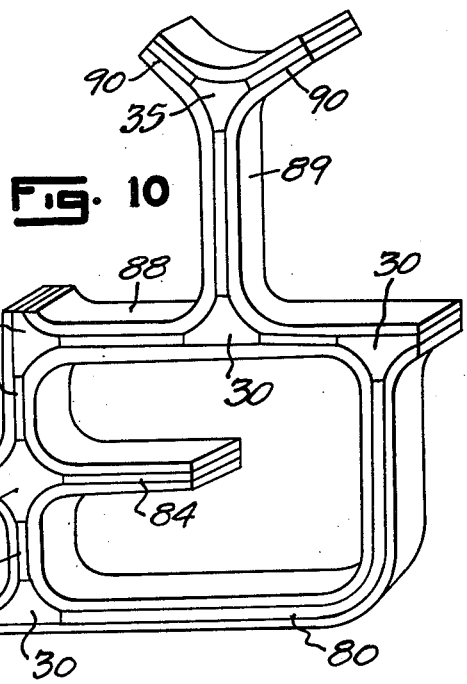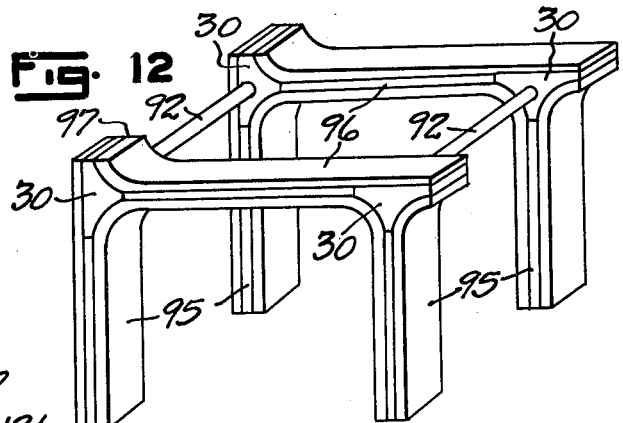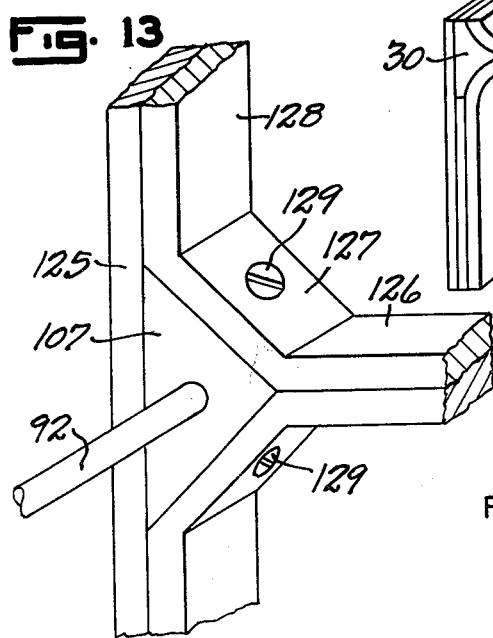

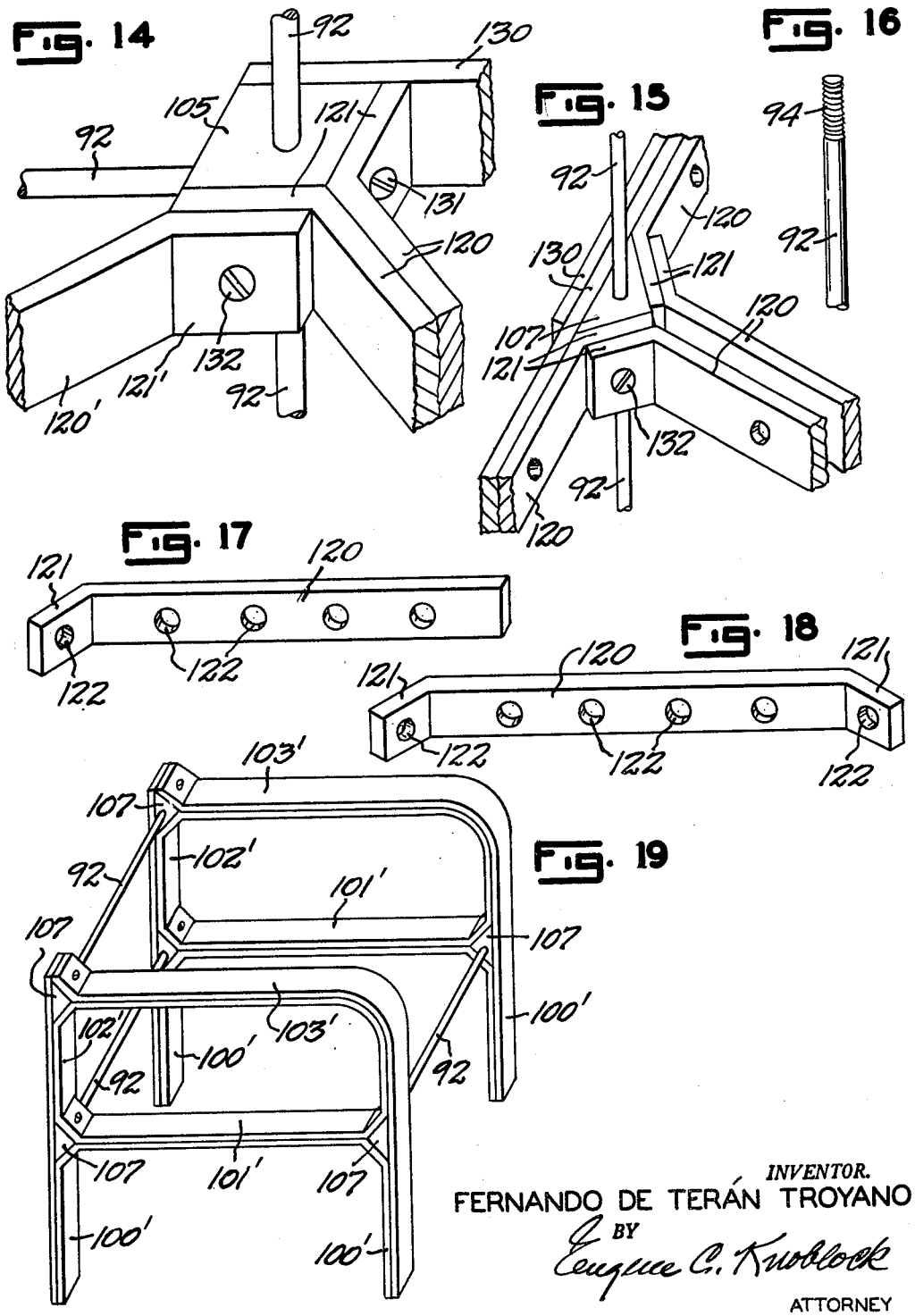

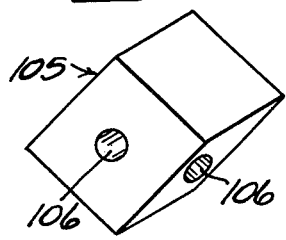
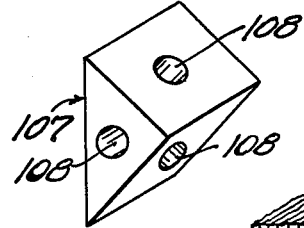
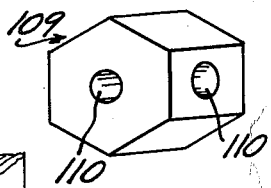
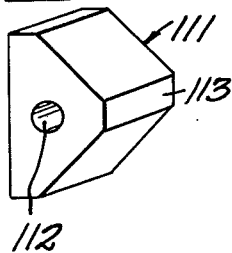
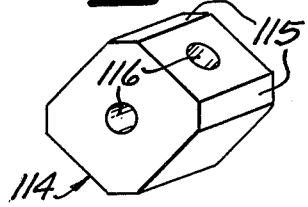
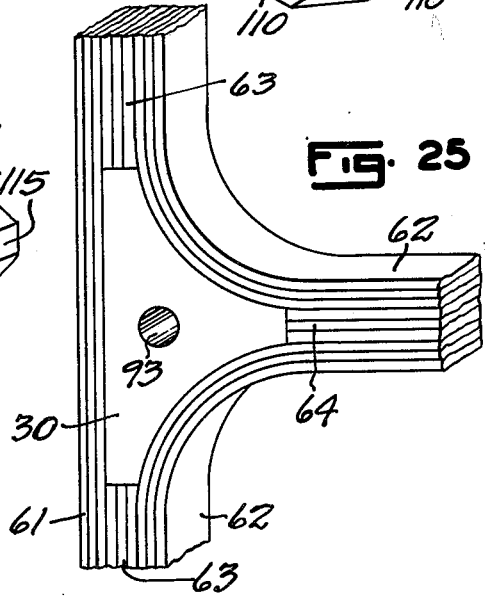
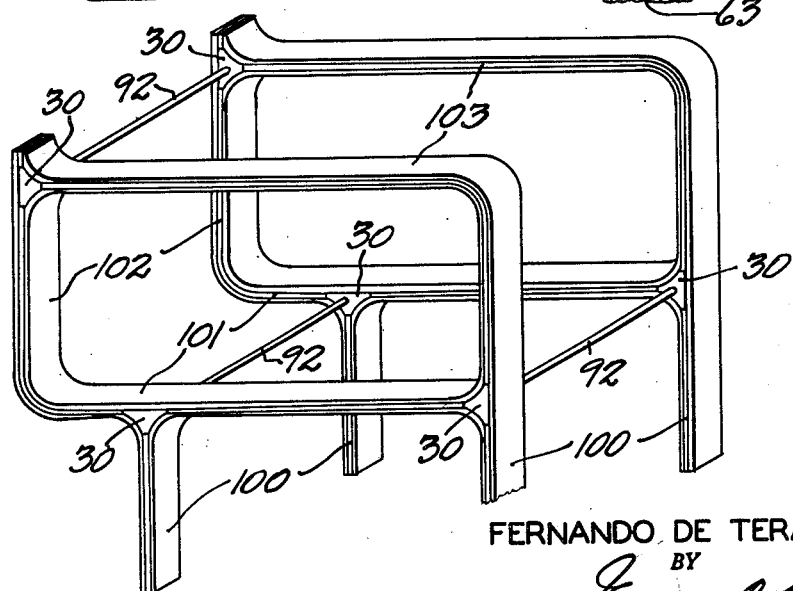

United States Patent Office 3,188,693
Patented June 15, 1965

3,188,693
JOINT STRUCTURE FOR CONNECTING
RELATED PARTS
Fernando de Terán Troyano, General Orgaz 11–4°B,
Madrid 20, Spain
Filed Mar. 14, 1962, Ser. No. 179,619
2 Claims. (Cl. 20—.5)

This invention relates to a joint structure for connecting angularly related parts, and particularly a joint structure for use in the fabrication of furniture, work tables, benches, machine frames, work supports, or any other structure wherein angularly extending structural elements must be interconnected.

The primary object of this invention is to provide a novel structure wherein a novel block is employed at the juncture of angularly extending parts, and is connected to such parts to provide a strong, attractive and unitary joint structure of durable character.

A further object of the invention is to provide a joint structure which accommodates the interconnection of members of different materials extending in different angular relations and positions, so as to accommodate a wide range of structural formations and to produce an attractive and strong product.

Other objects will be apparent from the following specification.

In the drawings:

FIG. 1 is a perspective view of a joint element usable in the invention;

FIG. 2 is a perspective view of a modified construction of joint element usable with the invention;

FIG. 3 is a perspective view of still another modified embodiment of joint element;

FIG. 4 is a perspective view of another modified embodiment of joint element usable in the invention;

FIG. 5 is a perspective view of another joint element usable with the invention;

FIG. 6 is a perspective view of still another joint element;

FIG. 7 is a perspective view illustrating a fragment of a product having a joint constructed by the use of the structural element illustrated in FIG. 1;

FIG. 8 is a fragmentary edge view of a joint portion of a structure produced by the use of a structural element as illustrated in FIG. 2;

FIG. 9 is a fragmentary perspective view of the joint portion of a structural member produced by the use of a joint member as illustrated in FIG. 4;

FIG. 10 is a perspective view of a structure having a number of joints produced by the use of structural elements similar to those illustrated in FIGS. 1, 2 and 3;

FIG. 11 is a perspective view illustrating a subassembly of a structure employing two interconnected joint elements of the character illustrated in FIG. 6;

FIG. 12 is a perspective view of a structure produced by elements which constitute embodiments of this invention;

FIG. 13 is a perspective view of a joint portion of a structure constituting another modified embodiment of this invention;

FIG. 14 is a perspective view of a part of a structural unit and constituting another embodiment of the invention;

FIG. 15 is a perspective view of a joint portion of a structure illustrating still another embodiment of the invention;

FIG. 16 is a fragmentary perspective view of a connector rod utilized in the invention;

FIG. 17 is a perspective view of a structural element utilized in structures as illustrated in FIGS. 14 and 15;

FIG. 18 is a perspective view of another structural element utilized in structures such as illustrated in FIGS. 14 and 15;

FIG. 19 is a perspective view of a chair frame constituting an embodiment of this invention;

FIG. 20 is a perspective view of another construction of joint element;

FIG. 21 is a perspective view of still another embodiment of joint element;

FIG. 22 is a perspective view of still another form which structural elements embodying this invention may take;

FIG. 23 is a perspective view of still another form which structural elements embodying this invention may take;

FIG. 24 is a perspective view of still another form which joint members constituting embodiments of this invention may take;

FIG. 25 is a fragmentary detail perspective view of a structure produced by elements embodying the invention and fabricated from plywood;

FIG. 26 is a perspective view of a chair frame constructed according to the invention;

FIG. 27 is a perspective view of another chair frame constructed according to the invention;

FIG. 28 is a perspective view of a leg or supporting structure for a stand or table constructed according to the invention.

Referring to the drawings which illustrate various embodiments of the invention, the numeral 30 designates a block or prismatic joint element formed of any suitable shape-retaining material of desired strength, such as wood, plastic, metal, glass or ceramic material. The block 30 is of generally triangular configuration having a pair of similar concave or part-cylindrical arcuate or curved surfaces 31 and a flat surface 32, said surfaces 31 and 32 being arranged in converging relation but separated by blunt or flat surfaces 33. Opposite side faces 34 of the block 30 preferably lie in parallel planes.

FIG. 2 illustrates another form of triangular block or prismatic joint element characterized by opposed flat plane surfaces 36 and a plurality of similar angularly related concave or part-cylindrical arcuate or curved surfaces 37 arranged in convergent relation but spaced apart and separated by blunt surfaces 38.

FIG. 3 illustrates a block or prismatic joint member of substantially cruciform shape characterized by opposed substantially parallel faces 41 and four substantially similar curved or arcuate part-cylindrical concave faces 42 arranged in convergent relation and terminating spaced from each other at blunt edge faces 43.

FIG. 4 illustrates another generally triangular block or joint member having opposed substantially parallel faces 46, a pair of converging concave or part-cylindrical faces 47 and a flat face 48, wherein the faces 47 and 48 converge at sharp edges.

FIG. 5 illustrates a block or prismatic joint member of substantially triangular shape characterized by a pair of substantially opposite faces 51 and a plurality of substantially similar curved converging concave or part-cylindrical faces 52 which meet at sharp edges and define a triangular unit having substantially equilateral structural dimensions.

FIG. 6 illustrates a block or joint member 55 having a pair of substantially parallel faces 56 and four part-cylindrical concave arcuate converging similar faces 57 which meet at sharp edges, the member 55 preferably being of modified star-shape in face view.

FIG. 7 illustrates fragmentarily the joint portion of a structure utilizing the block 30 in association with strips of plywood, plastic, metal or other suitable structural material for producing a structure of the desired physical properties and weight. A plywood or other structural strip 61 is secured in any suitable manner to the flat surface 32 of the member 30. Another structural strip 62 is provided with a bend which conforms with and abuts one curved surface 31 of the member 30 and is secured to the member 30 by any suitable means. Another structural strip 63 of a thickness substantially equal to the width of one of the faces 33 of the member 30 is positioned between and bonded or otherwise secured to the strips 61 and 62. Another member 64 of the same thickness may be secured to another part of the member 62 so that its face is tangent to another face 31 of the member 30. It will be understood that an additional bent structural strip similar to strip 62 may be secured to the member 64 and to the face 31 of the block shown exposed in FIG. 7, and that another strip similar to strip 63 may be assembled to complete a joint structure if desired. While cement or glue is commonly employed to bond the various strips to the block and to each other, it will be understood that other forms of fasteners, such as nails, screws, dowels and the like, may be employed to secure together the block and strips to form a joint structure, if desired.

FIGURE 8 illustrates a joint structure utilizing the block 35 and the structural strips 65, 66 and 67 bonded or secured to the curved faces 37 of member 35. Spacer strips 68 are secured to and interposed between the structural strips 65, 66 and 67 and abut against the end faces 38 of the member 35.

FIGURE 9 illustrates a construction utilizing block 45 and cooperating structural strips members which may be formed of plywood, plastic, metal or the like, as mentioned above. Two of these strip members 70 are bent to conform in to the curved surfaces 47 of the member 45, and a third strip member 71 bears against the flat face 48. The members 70 engage each other at 72 and engage the member 71 at 73. Any suitable means may be employed to bond or secure the members 70 and 71 to the member 45 and to each other.

FIGURE 10 illustrates a structure utilizing various forms of blocks or joint members and structural strips to produce a structure having elements or components extending in varying relations and positions with respect to each other, as might be required in the frame of a machine upon which motors, bearings, platens and other parts (not shown) are secured in assembling machines or machine tools. Thus in the form shown, which is solely illustrative and is not submitted as depicting a part of any specific machine or product, an L-shaped structural member 80 is employed which may be formed of a plurality of rigid metal strips abutting intermediate their ends, as in FIGS. 7 and 8, and suitably secured together. Member 80 is connected at one end by a block or joint member 30 to the lower portion of an upright 81 whose upper part is connected by a cruciform joint member 40 to an extension 82 of the upright, to a horizontal structural member 83 extending in one direction from member 40 and to a second horizontal member 84 extending in another direction from member 40. A supporting leg or strut 85 is connected with the member 83 by another joint member 30 intermediate the length of member 83, and the projecting or free end of the member 83 may support diverging arms 86 and 87 connected thereto by a joint member 35. The upper ends of the upright leg of the part 80 and of the upright member 82 are connected by joint members 30 to a horizontal cross member 88, to an intermediate point of which is connected, by means of another joint member 30, an upright member 89 whose upper end supports divergent inclined legs 90 connected thereto by joint member 35. The various joints of the FIG. 10 structure may be assembled and constructed in the manner illustrated in FIGS. 7 and 8. Thus it will be understood that each of the various structural parts 80, 81, 82, 83, 84, 85, 86, 87, 88, 89 and 90, above described, will be formed of a plurality of individual elements secured together, as by welding, bolting, riveting, adhering or otherwise securing the same to each other and to the joint members, such as the members 30, 35 and 40. The properties of strength, rigidity, etc. of a structure of this character will depend upon the properties of the strip, bar or other structural members from which the various structural parts are formed, such as the materials of which the structural members are made. It will be apparent from a consideration of FIG. 10 that structures having a wide range of shapes and configurations can be built.

In building the frame parts, it is frequently necessary in such units as furniture, table supports or the like to provide frame sub-assemblies or units which are interconnected in spaced relation to other or similar units. A sub-assembly which accommodates such fabrication is illustrated in FIG. 11 and is characterized by the use of rigid rods, dowels or the like, at 92 of suitable dimensions and physical properties which interconnect adjacent joint members, such as the joint members 55. For this purpose the joint members 55 may be provided with bores therein, preferably at flat faces thereof, such as the faces 56 of the members 55, which bores receive the ends of the cross-bar 92 and provide anchorage therewith. Thus the ends of the bar 92 may be screw-threaded and the bores in the members 55 may be screw-threaded or tapped to permit an interfit or connection of the parts.

FIGURE 12 illustrates a support or base which may be used for a machine or piece of furniture which is formed by a construction as illustrated in FIG. 11. Thus two support units or sub-assemblies may be produced, each having uprights or legs 95, a cross-member 96 and a rear upward projecting portion 97 in which the various parts 95, 96 and 97 are of constructions similar to those illustrated in FIGS. 7 and 8 utilizing the joint members 30 between said parts 95, 96 and 97. Cross-bars 92 connect the two sub-assemblies, the same extending between complementary members 30 of the respective sub-assemblies and preferably being connected similarly at their opposite ends to said complementary members 30.

FIGURES 26 and 27 illustrate the formation of chair frames from structures consising of sub-assemblies interconnected by cross-rods, and FIG. 28 illustrates the formation of a frame or leg unit for a piece of furniture or a work table or the like. In each of these units a construction as illustrated in FIG. 25 may be utilized. Thus FIG. 25 illustrates a joint member 30 provided with a central bore 93 in one flat face thereof to receive the end of a rod or bar 92 which may be screw-threaded at 94, as illustrated in FIG. 16, or which may be plain and cemented in the bore. The upright member of the FIG. 25 joint construction is formed of part 61 and the upright parts of bent members 62, together with the interposed spacer parts 63, while the horizontal members of the joint construction are formed by the horizontal parts of the members 62 and an interposed spacer part 64, as previously described. Cement or securing means interconnect the parts 30, 61, 62, 63 and 64.

It will be seen that the FIG. 25 construction is utilized in the chair frame shown in FIG. 26 to provide two sub-assemblies. Each sub-assembly has a pair of upright legs 100, a horizontal seat-supporting rail 101, a back rest supporting upright 102, and an L-shaped arm rest 103. The two sub-assemblies are interconnected by a plurality of cross-rods 92 extending between them at the various joint members 30 of the sub-assemblies.

The chair frame construction illustrated in FIG. 27 utilizes the same basic principle and arrangement of parts to provide sub-assemblies having the chair legs 100, the seat rails 101, and the back rest rails or uprights 102. Interconnection of these sub-assemblies is effected by the rods 92 extending between complementary joint members 30. Also, where interconnection of the sub-assemblies is desired at points not provided with joint members, a cross-bar 104 may be provided, as seen in FIG. 27.

The construction of the table support of FIG. 28 from sub-assemblies is the same as that in FIGS. 26 and 27 and similar parts bear similar reference numerals.

The formation of joint blocks with curved concave faces is not required in the practice of the invention, and FIGS. 13, 14, 15 and 19 illustrate structures and assemblies, and FIGS. 17, 18, 20, 21, 22, 23 and 24 illustrate joint elements or blocks in which curved surfaces are avoided.

In the construction shown in FIG. 20, a generally cubical joint member or block 105 is utilized, the same being provided at the center of one or more faces thereof with a bore 106 adapted to accommodate a connecting rod 92.

The joint member 107, illustrated in FIG. 21, discloses a prismatic triangular joint member or block having flat surfaces which are interrupted at three or more of said surfaces by rod-receiving apertures or bores 108.

FIG. 22 discloses a hexagonal prismatic joint member or block 109 having flat surfaces and provided at two or more of said surfaces with central apertures 110 adapted to receive the rods 92.

The joint member or block 111 illustrated in FIG. 23 is of modified triangular prismatic form, being characterized by flat surfaces having one or more thereof interrupted by a central bore 112 and having the converging surfaces which outline the triangular configuration thereof separated by intervening surfaces 113 to define blunt corners.

A modified cubical joint member or block 114 may be provided which has beveled faces 115 defining selected corner portions thereof. Selected faces of this member may be provided with centrally positioned bores 116 adapted to receive the ends of connectors 92.

The structural members, strips or bars usable with these joint members may be of the character illustrated in FIGS. 17 and 18, wherein a bar, plate or strip 120 is provided with one or more diagonally bent portions 121 extending therefrom at a selected angle, such as an angle of 45 degrees. The bars may be provided with apertures 122 spaced along their length and of any selected diameter to receive bolts or screws or the like.

The joint portion of a structure utilizing a prismatic triangular joint member 107 is illustrated in FIG. 13. In this construction a rigid structural vertical strip or plate 125 bears flat against and is secured to the base surface of the triangular member 107. A pair of modified L-shaped rigid structural members, strips or bars, each having a horizontal part 126, an inclined or oblique part 127 and an upright bar 128 are provided. The inclined or oblique parts 127 bear against the diverging oblique or inclined faces of the member 107 and are secured thereto by securing members 129. The horizontal parts 126 of the two structural strips or members are suitably secured together by welding, bolting, bonding or other means. Upright parts 128 are secured to the vertical member 125 to define an upright composite or structural unit. The cross member 92 will be screw-threaded or otherwise secured within a bore in the member 107.

FIGURE 14 discloses the joint part of a structure formed by the use of a joint member or block 105 and frame-forming rigid structural strips, bars or members which extend substantially horizontally therefrom in different directions or relations. In this instance one or more rods 92 are secured to the member or block 105 and extend vertically, and another rod 92 extends horizontally from block 105. Straight rigid structural bar member 130 is secured at one face of the member or block 105 by any suitable means. A pair of rigid structural bars or members 120 are secured together, back to back, with their ends 121 diverging angularly and bearing against adjacent surfaces of the block 105 and secured thereto by screws, bolts or other securing means 131 and 132. Another rigid structural bar or member 120' extends divergently to the last named structural members 120 and has its angularly bent end part 121' secured to the block 105 and positioned in face engagement with one of the angular parts 121 of a bar 120, said parts being secured together by the securing member 132 which passes into the joint member 105.

Another joint portion of a structure which utilizes a joint member 107 and a plurality of rigid structural members or bars is illustrated in FIG. 15. In this construction the parts bear the same reference numerals hereinabove utilized as they are similar to or pertinent thereto.

A chair frame, generally similar to that illustrated in FIG. 26, but utilizing joint members 107 in its construction, is illustrated in FIG. 19, the same having sub-assemblies formed from the legs 100', seat rails 101', back rest supports 102', and arm rests 103', and utilizing rods 92 between the structural sub-assemblies and, specifically, between the joint members 107.

It will be apparent from the illustrations and from the examples herein described that the invention provides great flexibility to accommodate the formation of structures of a wide range of sizes and shapes, all of which are of any strength required for their intended purpose, and which may be formed from any suitable material. Likewise, it will be apparent that only a few shapes and sizes of joint members or blocks and of structural parts connected by such blocks need be provided, and yet from these members a wide range of structural shapes and end products may be constructed. Also, it will be understood that, while reference has been herein to the use of structural elements formed of plywood, plastic and metal, etc., the invention is not limited to the use of those materials, but may incorporate the use of other materials capable of assuming shapes to cooperate with the joint members.

Each of the joint structures is characterized by laminated rigid structural members formed by connected strip members, at least some of the laminations or strip members of which are bent so as to form parts of two angularly extending laminated structural members and to extend along and be secured to joint blocks. Thus the joint blocks are located between or confined by portions of the strip members or laminations defining adjacent structural members and are integrally correlated to the laminated structural members in a manner to impart strength and rigidity to the joint structure.

While the preferred embodiment of the invention has been illustrated and described, it will be understood that changes in this construction may be made within the scope of the appended claims.

I claim:

1. A self-supporting structure comprising a frame formed of two sub-assemblies, each sub-assembly having a plurality of elongated laminated structural members defining at least a pair of supporting parts and a connecting part and said laminated structural members extending in angular relation at joints therebetween, the angle between at least two adjacent laminated structural members at any joint being less than 180 degrees, and a plurality of blocks each interposed between parts of adjacent laminated structural members at said joints, at least one lamination of each structural member of each sub-assembly forming a part of another laminated structural member connected thereto and being in face to face engagement with one face of said block, means securing each said one lamination part to said one face of said block, and selected blocks of each sub-assembly each confronting a similar block of the other sub-assembly, and a plurality of rigid elongated members secured to and interconnecting said confronting blocks defining a rigid structure with multiple pairs of supporting parts.

2. A structure as defined in claim 1, wherein
   each of said interconnected confronting blocks has an exposed surface confronting a similar surface of a confronting block and interrupted by an aperture in which an end part of one of said interconnecting members is secured.

References Cited by the Examiner

UNITED STATES PATENTS

| | | | |
|---|---|---|---|
| 285,605 | 9/83 | Flora | 182—215 |
| 2,207,939 | 7/40 | Nordby | 20—92 X |
| 2,335,629 | 11/43 | Andreef. | |
| 2,388,485 | 11/45 | Jensen | 20—.5 X |

FOREIGN PATENTS

| | | |
|---|---|---|
| 17,561 | 8/99 | Great Britain. |
| 107,444 | 7/17 | Great Britain. |
| 577,560 | 6/24 | France. |
| 917,891 | 1946 | France. |
| 1,130,897 | 2/57 | France. |
| 565,164 | 3/58 | Belgium. |
| 835,881 | 5/60 | Great Britain. |

JACOB L. NACKENOFF, *Primary Examiner.*